Figure 1:
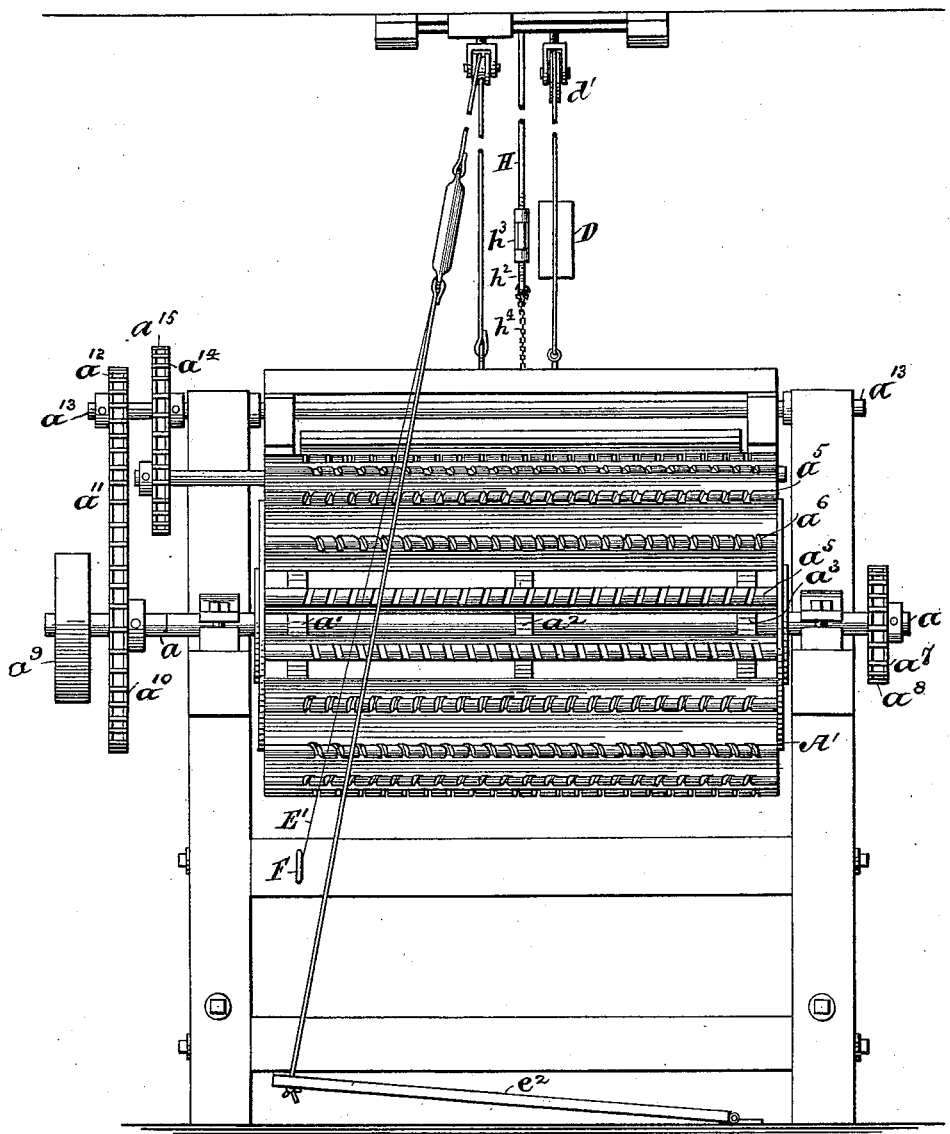

(No Model.)  2 Sheets—Sheet 1.
C. H. MERRITT.
HAT SIZING OR SHRINKING MACHINE.

No. 406,456. Patented July 9, 1889.

Witnesses:
Florence E. Edie.
William H. Robinson.

Inventor:
Charles H. Merritt
By his attorneys
Gifford & Brown (No Model.) 2 Sheets—Sheet 2.
C. H. MERRITT.
HAT SIZING OR SHRINKING MACHINE.
No. 406,456. Patented July 9, 1889.
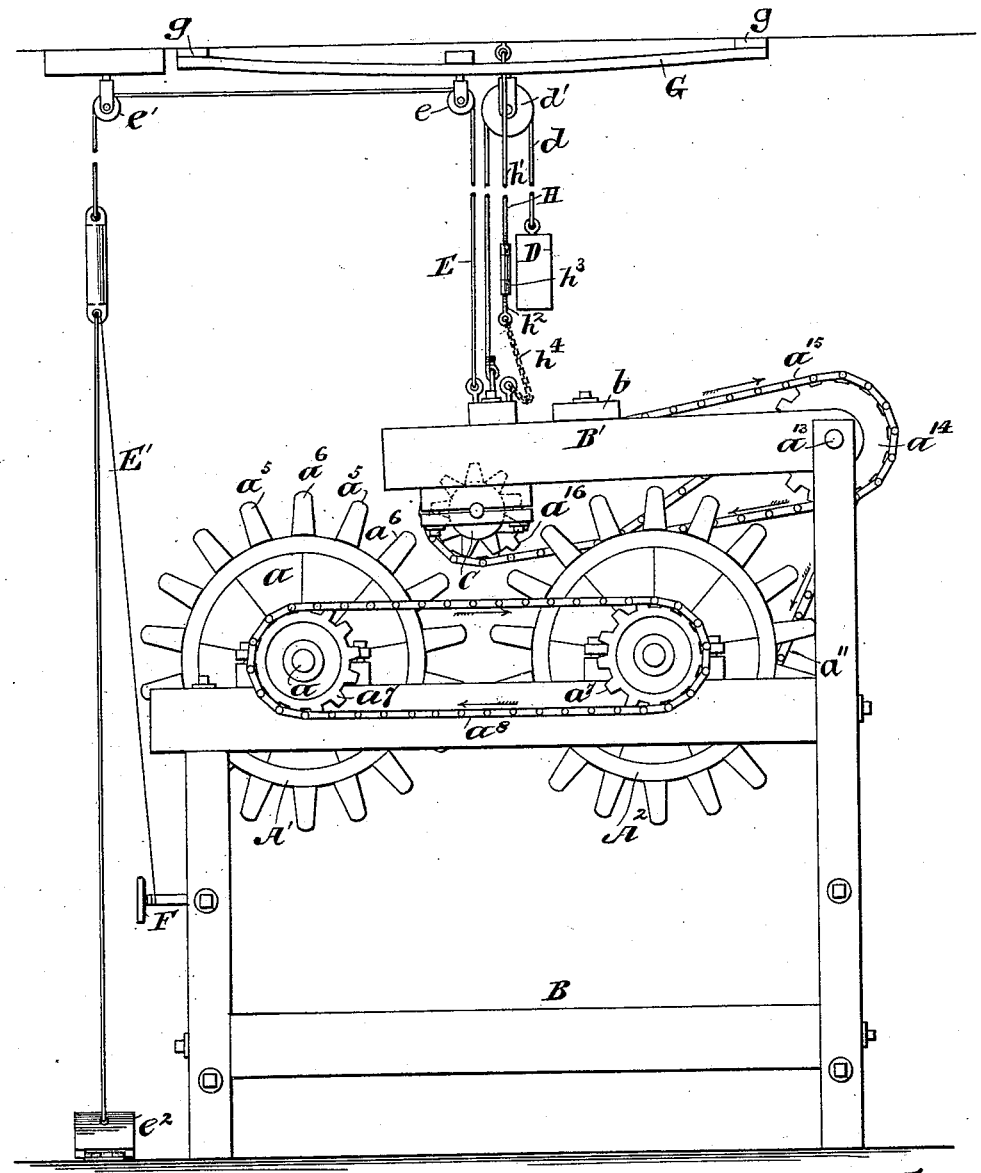

UNITED STATES PATENT OFFICE.

CHARLES H. MERRITT, OF DANBURY, CONNECTICUT.

HAT SIZING OR SHRINKING MACHINE.

SPECIFICATION forming part of Letters Patent No. 406,456, dated July 9, 1889.

Application filed October 25, 1888. Serial No. 289,120. (No model.)

*To all whom it may concern:*

Be it known that I, CHARLES H. MERRITT, of Danbury, in the county of Fairfield and State of Connecticut, have invented a certain new and useful Improvement in Hat Sizing or Shrinking Machines, of which the following is a specification.

I will describe a hat-sizing machine embodying my improvement, and then point out the novel features in the claims.

In the accompanying drawings, Figure 1 is a front view of a machine embodying my improvement. Fig. 2 is a side view thereof.

Similar letters of reference designate corresponding parts in both figures.

$A'$ $A^2$ designate two wheels or drums, which are supported side by side in a framing B, which may be of any suitable construction. The wheels or drums $A'$ $A^2$ severally consist of disks $a'$ $a^2$ $a^3$, secured to an axle or shaft $a$, and having a number of lags $a^5$ $a^6$ secured to their peripheries, so as to extend parallel with the shaft or axle. These lags are shown as slightly convexed on the outer surface and as provided with oblique grooves. It will be observed that the grooves of the lags $a^5$ extend in the reverse direction from the grooves of the lags $a^6$, and that the grooves of the series of lags $a^5$ begin opposite the spaces between the grooves in the other series of lags $a^6$. The wheels or drums $A'$ $A^2$ have wheels $a^7$ affixed to their shafts or axles. These wheels are shown as sprocket-wheels. A chain $a^8$ engages with them. Motion is therefore transmitted from the shaft of one of the wheels or drums $A'$ $A^2$ to the shaft of the other. The wheel $A^2$ has a belt-pulley $a^9$ affixed to its shaft. Motion may therefore be imparted by means of a belt to the wheel $A^2$, and from the latter to the wheel $A'$. The wheel $A^2$ has affixed to its axle a wheel $a^{10}$, shown as made in the form of a sprocket-wheel. A chain extends around this wheel $a^{10}$, and also around a wheel $a^{12}$, affixed to a shaft $a^{13}$. Motion will therefore be transmitted from the shaft of the wheel $A^2$ to the shaft $a^{13}$.

C designates a wheel or drum located above and about midway between the wheels or drums $A'$ $A^2$. It is much smaller in diameter than the wheels or drums $A'$ $A^2$, and is provided with lags, which may be similar to the lags of these wheels or drums. The shaft of this wheel or drum C is journaled in a swinging frame B'. This swinging frame is pivotally connected to the frame B through the medium of the shaft $a^{13}$, or at a point coincident with the axis of said shaft. This shaft $a^{13}$ has a sprocket-wheel $a^{14}$ affixed to it. A belt $a^{15}$ extends from the sprocket-wheel $a^{14}$ to a sprocket-wheel $a^{16}$, which is affixed to the shaft of the wheel or drum C. Motion is therefore transmitted from the shaft $a^{13}$ to the wheel or drum C.

The frame B' has combined with it a counterbalance-weight D, which is suspended by a cord or chain $d$ connected to it at one end, passing around a pulley $d'$, and secured to the frame B' at the other end. The frame B' is shown as provided with a weight $b$, which may be slid lengthwise of said frame nearer to or farther from the shaft $a^{13}$, so that this frame and its appurtenances may be made to more or less overbalance the weight D. The weight D, by partially counterbalancing the weight of the frame and its appurtenances, facilitates the adjustment of the frame.

The frame B' has combined with it a cord or chain E, which is fastened to the latter at one end, passes around a pulley $e$, thence around a pulley $e'$, and at the other end is fastened to a treadle $e^2$. The attendant having charge of the machine, by placing his foot upon the treadle, may raise the frame B' more or less. When the treadle is released, the frame B' will descend, so that the wheel or drum C will coact with the wheels or drums $A'$ $A^2$.

The cord or chain E is shown as having fastened to it a cord or chain E'. The cord or chain E' may be fastened to a cleat or other device F, arranged upon the frame B. By pulling upon the cord E' the frame B' may be raised, and if the cord E' is then secured to the cleat it may serve to hold the frame B' permanently suspended during such time as it is desired to keep the wheel or drum C permanently out of operation. While the treadle is in use the wheel or drum C may be raised or lowered more or less, as occasion may require.

The pulleys $d'$ $e$ $e'$ are secured to an overhead support. The pulley $e'$ is shown as secured to a rigid support attached to the ceiling. The pulleys $e$ $d'$ are, however, secured to a yielding support. This yielding support consists of two or more springs, which may consist of boards G, secured at the ends to cross-pieces $g$, attached to the ceiling and having fastened to them cross-pieces which serve as a means for conveniently attaching the pulleys $e$ and $d'$. Owing to the pulleys $e\ d'$ being secured to a yielding support, the weight D will operate upon the frame B' with a yielding action, and the treadle will operate upon the frame B with the same yielding action.

I have combined with the frame B' a stop H for limiting its downward movement. This stop consists, as here shown, of a rod $h'$, another rod $h^2$, a turn-buckle $h^3$, uniting the two rods $h'\ h^2$, and a chain $h^4$, connecting the rod $h^2$ with the frame B'. While this stop prevents the frame B' from being lowered beyond a certain distance, it does not prevent its being raised, owing to the use of the chain $h^4$ as a component part. The turn-buckle provides for lengthening or shortening, or, in other words, adjusting the stop to vary the degree to which the wheel or drum C may be lowered.

The operator is to place a hat or a number of hats, taken from the scalding-tub and prepared upon a plank, in the space between the upper portions of the two wheels or drums A' A². After subjecting the hat or hats to the action of these two wheels or drums a proper length of time he will lower the smaller wheel or drum and allow it to coact with the large wheels or drums.

What I claim as my invention, and desire to secure by Letters Patent, is—

1. In a hat-sizing machine, the combination of two large wheels or drums provided with obliquely-slotted lags, substantially as specified.

2. In a hat-sizing machine, the combination of two large wheels or drums and a smaller wheel or drum having obliquely-slotted lags arranged intermediately thereof and above the adjacent portion of the same, substantially as specified.

3. In a hat-sizing machine, the combination of two large wheels or drums having lags provided with oblique slots and a smaller wheel or drum arranged above and intermediately of them and supported by a swinging frame, substantially as specified.

4. In a hat-sizing machine, the combination of two large wheels or drums and a smaller wheel or drum arranged above and intermediately of them, and having a vertically-movable support, all of said wheels or drums having obliquely-slotted lags, substantially as specified.

5. In a hat-sizing machine, the combination of two large wheels or drums, a smaller wheel or drum having a vertically-movable support, a sliding weight on said support, and a counterbalance-weight connected by a cord or chain to the vertically-movable support, substantially as specified.

6. In a hat-sizing machine, the combination of two large wheels or drums, a smaller wheel or drum having a vertically-movable support, a counterbalance-weight connected by a cord or chain to the vertically-movable support, a guide or pulley around which the cord or chain passes, and a spring sustaining the said guide or pulley, substantially as specified.

7. In a hat-sizing machine, the combination of two large wheels or drums, a smaller wheel or drum having a vertically-movable support, a treadle, a cord or chain connecting the vertically-movable support and treadle, a guide or pulley around which the cord or chain passes, and a spring sustaining said guide or pulley, substantially as specified.

8. In a hat-sizing machine, the combination of two large wheels or drums, a smaller wheel or drum having a vertically-movable support, a treadle, a cord or chain connecting the vertically-movable support and treadle, a guide or pulley around which the cord or chain passes, a spring sustaining said guide or pulley, a cleat, and an engaging device for the cord or chain serving to secure the latter when it is desired to permanently elevate the smaller wheel or drum, substantially as specified.

CHARLES H. MERRITT.

Witnesses:
WM. H. BARNUM,
G. F. WHITLOCK.